(12) United States Patent
Shin

(10) Patent No.: US 6,577,692 B1
(45) Date of Patent: Jun. 10, 2003

(54) CLOCK FORWARDING CIRCUIT WITH AUTOMATIC CLOCK DELAY DETECTION AND INITIAL PARAMETER SETTING FEATURES

(75) Inventor: Young-Min Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 09/449,147

(22) Filed: Nov. 24, 1999

(30) Foreign Application Priority Data

Aug. 16, 1999 (KR) ............................................. 99-33711

(51) Int. Cl.[7] ................................................. G06F 1/12
(52) U.S. Cl. ........................ 375/357; 375/373; 370/517; 709/208
(58) Field of Search ................................. 375/354, 356, 375/357, 358, 371–373; 370/507, 516, 517, 519; 709/208, 210; 713/400; 327/141, 142, 154, 155

(56) References Cited

U.S. PATENT DOCUMENTS

| | | | |
|---|---|---|---|
| 4,525,849 A | 6/1985 | Wolf | .......................... 375/118 |
| 4,811,364 A | 3/1989 | Sager et al. | ................. 375/106 |
| 4,979,190 A | 12/1990 | Sager et al. | ................. 375/106 |
| 5,918,040 A * | 6/1999 | Jarvis | .......................... 709/400 |
| 6,084,934 A * | 7/2000 | Garcia et al. | ................ 375/370 |
| 6,236,623 B1 * | 5/2001 | Read et al. | .................... 368/46 |

* cited by examiner

Primary Examiner—Amanda T. Le
(74) Attorney, Agent, or Firm—Mills & Onello LLP

(57) ABSTRACT

A clock forwarding circuit automatically detects the delay in transmission of data between a master circuit such as a central processing unit and a slave circuit such as a semiconductor memory and forwards clocks corresponding to the delay. The master circuit includes a clock forwarding circuit which generates a clock signal. The slave circuit is coupled to the master circuit and generates a second clock signal which is synchronized with the first clock signal. The clock forwarding circuit receives the second clock signal, detects delay between the first and second clock signals and sets initial data load/unload parameters of the master circuit based on the detected delay. By forwarding clocks, the data transmission between the clocked circuits can be performed in faultless fashion independently of the delay.

8 Claims, 10 Drawing Sheets

| Max. Delay | Init_UNLD<1:0> |
|---|---|
| MD < 1 Bit Time | 01 |
| 1 < MD ≤ 2 Bit Time | 11 |
| 2 < MD ≤ 3 Bit Time | 10 |
| 3 < MD ≤ 4 Bit Time | 00 |

CLOCK FORWARDING CIRCUIT WITH AUTOMATIC CLOCK DELAY DETECTION AND INITIAL PARAMETER SETTING FEATURES

FIELD OF THE INVENTION

The present invention relates to a digital information processing integrated circuit (IC), and more particularly to a digital information processing IC for detecting a delay between interfacing clocks and setting initial data loading/unloading parameters of the IC automatically.

BACKGROUND OF THE INVENTION

FIG. 1 is a schematic block diagram illustrating a clocked system having a master circuit 10 such as a microprocessor, e.g., CPU, and a slave circuit 20 such as a semiconductor memory device and a signal bus (or system bus). Referring to FIG. 1, the slave circuit 20 is externally interfaced with the master circuit 10 through clock and data paths. The master circuit 10 generates a clock signal CLK_OUT and data DATA_OUT which are intended for the slave circuit 20. The slave circuit 20 receives the clock signal CLK_OUT and the data DATA_OUT, and then generates a clock signal CLK_IN and data DATA_IN for the master circuit 10. The clock signal CLK_IN is a feedback clock signal of the output clock signal CLK_OUT. The master circuit 10 uses the clock signal CLK_IN in loading the data DATA_IN from the slave circuit 20, and processes the loaded input data DATA_IN internally with the clock signal CLK_OUT.

FIGS. 2A–2C are timing diagrams illustrating a relationship between input and output clock signals CLK_IN and CLK_OUT of the master circuit of FIG. 1. Referring to FIGS. 2A–2C, there exists a delay between the clock signals CLK_OUT and CLK_IN caused by the structure of the motherboard, which includes the master circuit 10 and slave circuit 20.

In prior systems, the delay did not cause a substantial problem because of the relatively low clock speed of the circuits. As shown in FIG. 2A, the low clock speed ensures a sufficient operating margin for data loading and unloading operations of the master circuit 10. Recent improvements in technology have caused the clock speed of the master circuit 10 and the slave circuit 20 to increase. As shown in FIG. 2B, as the clock speed of the circuits 10 and 20 increases, the operating margin is reduced. As a result, the data DATA_IN from the slave circuit 20 can be transmitted to the master circuit 10 with undesirable faults. To illustrate, referring to FIG. 2C, if the clock speed is so high so as not to ensure the operating margin, it is difficult to transmit the data DATA_IN to the master circuit without error. The data unloading process of the master circuit 10 cannot be performed after the data loading operation, since the output clock signal CLK_OUT occurs prior to the input clock signal CLK_IN, without the operating margin. In particular, in a high-performance computer system, avoiding this interfacing problem becomes more difficult as processing speed increases. One solution of the problem is a clock forwarding method.

FIG. 3 is a timing diagram illustrating a relationship between input and output clock signals CLK_IN and CLK_OUT of the master circuit 10 of FIG. 1 in which a clock forwarding method is applied. In this method, several clock periods corresponding to the delay are forwarded to the output clock signal CLK_OUT by a clock forwarding circuit 100 of FIG. 1. Thus, the data unloading process of the master circuit 10 can be performed after the data loading operation. Therefore, the input data DATA_IN from the slave circuit 20 can is transmitted to the master circuit 10 without error.

Initial data loading/unloading parameters of the clock forwarding circuit 100 must be determined. Generally, the initial parameters are predetermined and stored manually in an external read only memory (ROM) (not shown) coupled to the clock forwarding circuit 100 as a fixed value by a motherboard designer. In initializing the master circuit 10 after powering up, the initial parameters are loaded to the clock forwarding circuit 100 such that clocks can be forwarded. As shown in FIG. 3, by forwarding clocks, the loaded input data from the slave circuit 20 can be unloaded to the master circuit 10 in faultless fashion.

Examples of the clock forwarding method are illustrated in U.S. Pat. No. 4,811,364 to Sager et al., issued on Mar. 7, 1989, "METHOD AND APPARATUS FOR STABILIZED DATA TRANSMISSION"; U.S. Pat. No. 4,979,190 to Sager et al., issued on Dec. 18, 1990, "METHOD AND APPARATUS FOR STABILIZED DATA TRANSMISSION"; and U.S. Pat. No. 4,525,849 to Wolf, issued on Jun. 25, 1985, "DATA TRANSMISSION FACILITY BETWEEN TWO ASYNCHRONOUSLY CONTROLLED DATA PROCESSING SYSTEMS WITH A BUFFER MEMORY", all of whose discloses are incorporated herein by reference.

As described above, in prior conventional systems, the initial parameters for forwarding clocks are provided manually by a motherboard designer, so that product cost is increased in proportion to the increased labor. In addition, since the initial parameters are stored to the external ROM as fixed values, undesirable faults of data transmission can occur due to product deviation. For these reasons, it is difficult to stabilize data transmission between clocked circuits.

SUMMARY OF THE INVENTION

It is therefore an object of the present invention to provide a digital information processing IC for automatically detecting a delay between interfacing clocks and setting initial data loading/unloading parameters to stabilize data transmission between clocked circuits.

In order to attain the above objects, according to an aspect of the present invention, there is provided a digital system comprising a master circuit having a clock forwarding circuit for generating a first clock signal and a slave circuit coupled to the master circuit for generating a second clock signal synchronized with the first clock signal. The clock forwarding circuit receives the second clock signal, detects a delay between the first and second clock signals, and sets initial data load/unload parameters of the master circuit based on the detected delay.

In one aspect, the clock forwarding circuit of the invention includes a clock generator for generating a clock signal and a data control logic coupled to the clock generator and an internal data bus, the data control logic outputting data to a slave circuit in response to the clock signal. An output clock control logic is coupled to the clock generator to provide the clock signal to the slave circuit as an output clock signal by controlling the clock signal. A delay detection circuit detects a delay between the output clock signal and an input clock signal and generates an initial parameter for forwarding clocks corresponding to the detected delay. The input clock signal is a feedback clock signal of the output clock signal. A load/unload clock control logic is coupled to the delay detection circuit and the input clock control logic to generate load control signals and unload control signals in response to the initial parameter. An input clock control logic is coupled between the clock generator and the load/unload clock control logic to provide the clock signal from the clock generator to the load/unload clock control logic by controlling the clock signal. A load/unload multiplexer loads input data from the slave circuit and unloads the loaded input data to the internal data bus of the master circuit via the data control logic in response to the load and unload control signals from the load/unload clock control logic.

As is apparent from the foregoing, according to the digital system of the invention, data transmission between clocked circuits can be performed without error independently of the delay.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
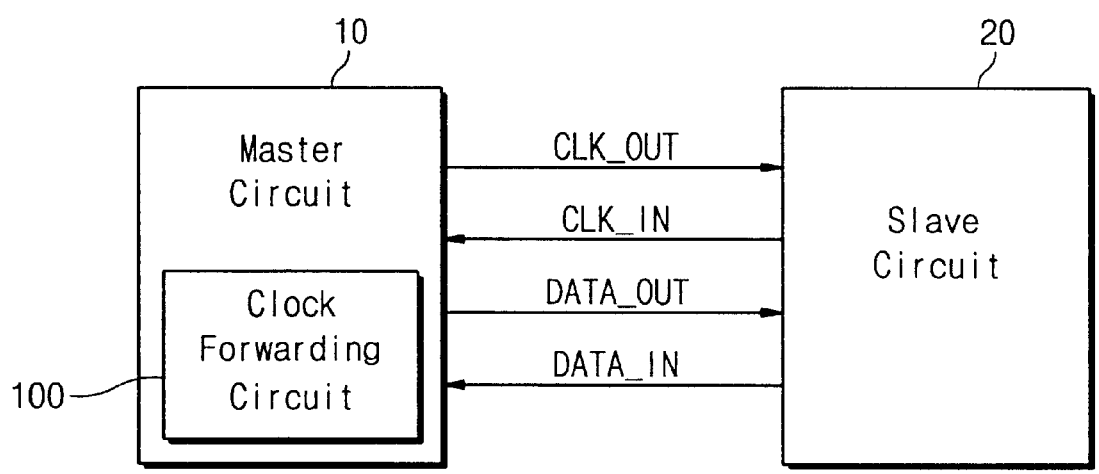
FIG. 1 is a schematic block diagram illustrating a clocked system including a master circuit and a slave circuit.
Figure 2A:
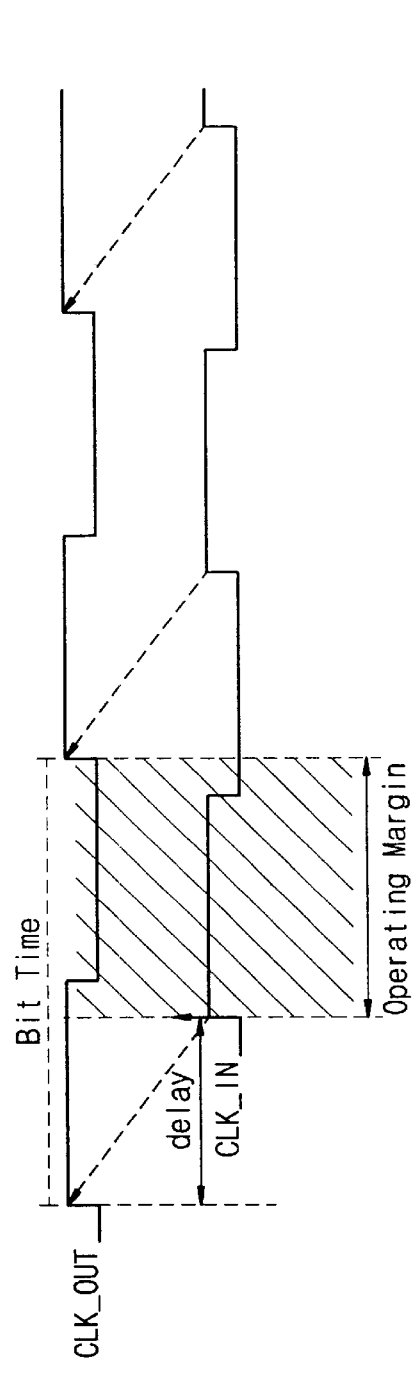
FIGS. 2A–2C are timing diagram illustrating a relationship between input and output clock signals of the master circuit of FIG. 1.
Figure 2B:
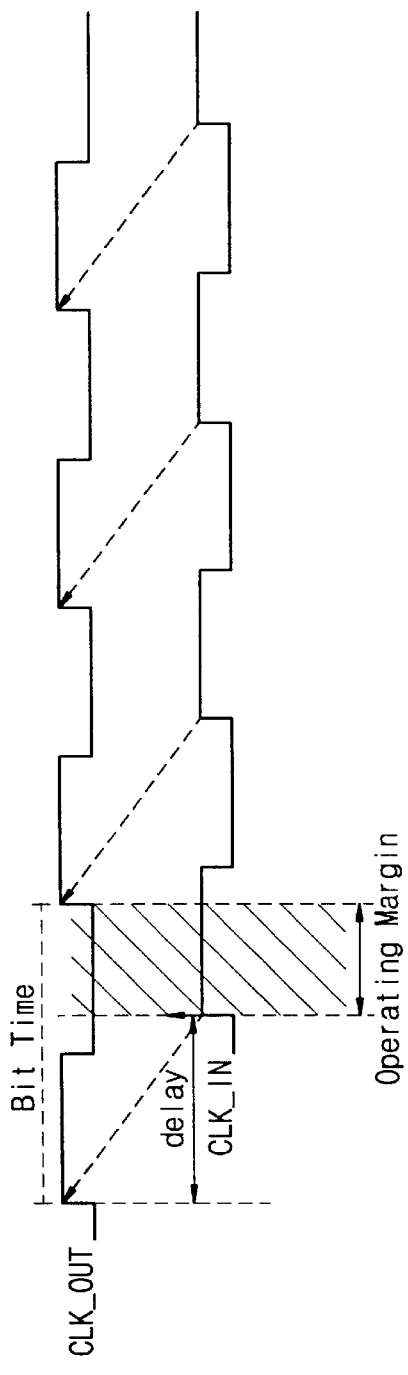
Figure 2C:
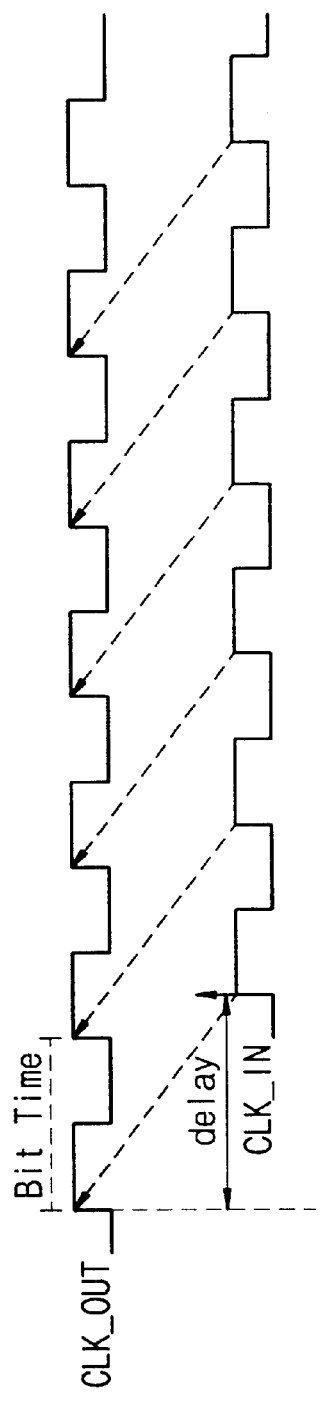
Figure 3:
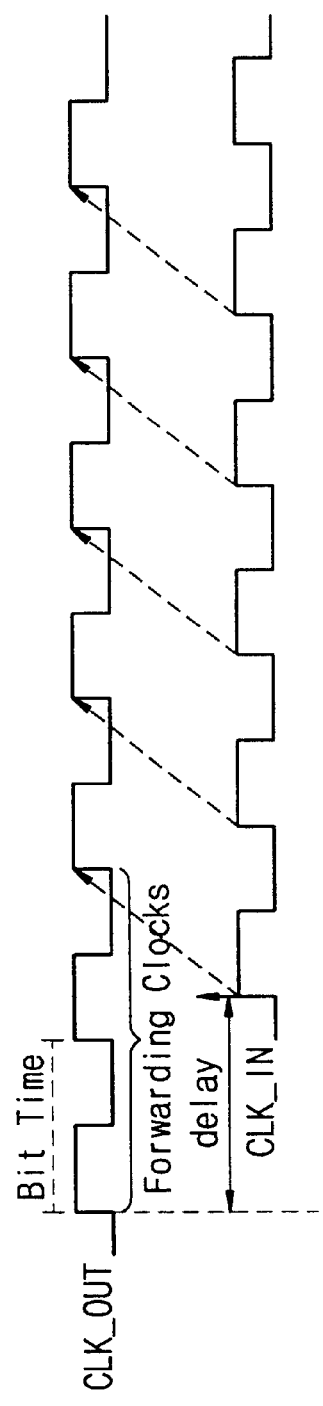
FIG. 3 is a timing diagram illustrating a relationship between input and output clock signals of the master circuit of FIG. 1 according to a clock forwarding method.
Figure 4:
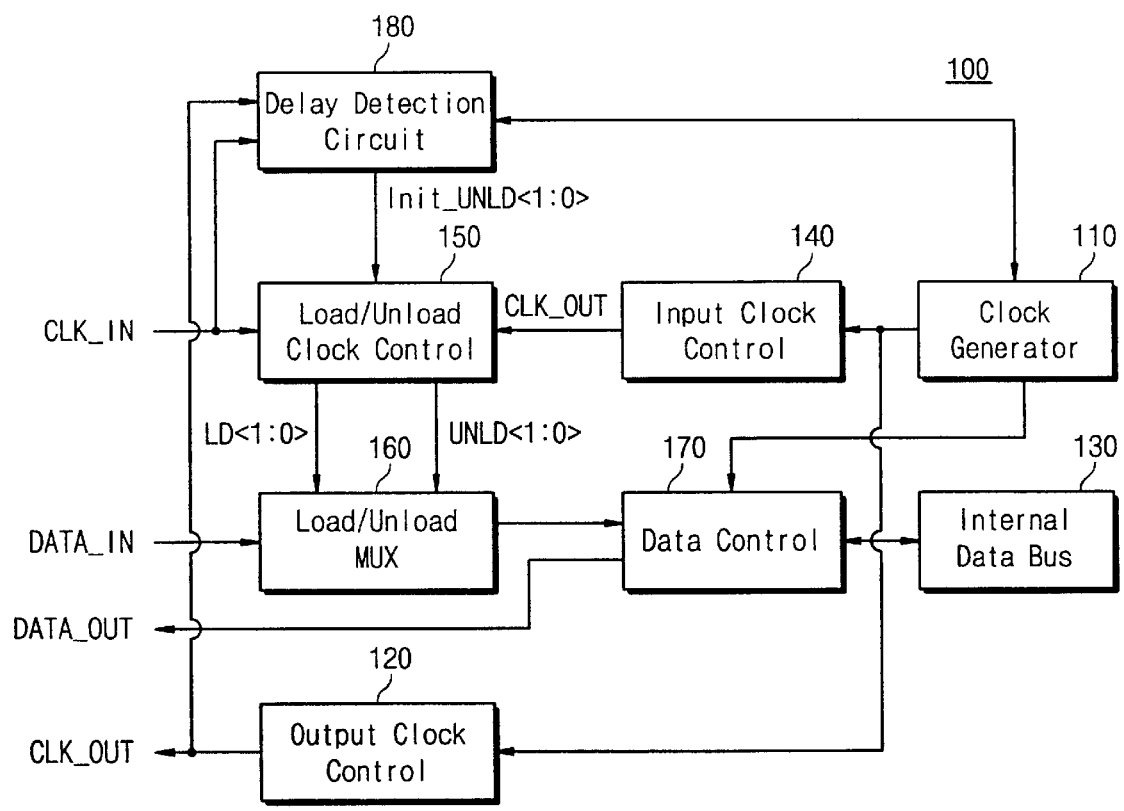
FIG. 4 is a schematic block diagram illustrating a clock forwarding circuit of a master circuit according to one embodiment of the present invention.

FIG. 4 is a schematic block diagram illustrating one embodiment of a clock forwarding circuit according to the present invention. Referring to FIG. 4, the clock forwarding circuit 100 comprises a clock generator 110, an output clock control logic 120, an internal data bus 130, an input clock control logic 140, a load/unload clock control logic 150, a loading/unloading multiplexer (MUX) 160, a data control logic 170, and a delay detection circuit 180.

The clock generator 110 generates a bit clock for data input and output. The output clock control logic 120 generates an output clock signal CLK_OUT to the slave circuit by controlling the clock signal from the clock generator 110. An output data DATA_OUT from the internal data bus 130 of the master circuit is outputted to the slave circuit through the data control logic 170.

The slave circuit receives the clock signal CLK_OUT and the data DATA_OUT and then outputs an input clock signal CLK_IN and an input data DATA_IN to the clock forwarding circuit 100 of the master circuit. The input clock signal CLK_IN is a feedback clock signal of the output clock signal CLK_OUT. Between the output clock signal CLK_OUT and the input clock signal CLK_IN, a delay exists due to the structure of the motherboard including the master circuit and the slave circuit.

To stabilize data transmission between the circuits, the delay detection circuit 180 automatically detects the delay and generates an initial parameter Init_UNLD and applies the signal to the load/unload clock control logic 150. The initial parameter Init_UNLD corresponds to the delay.

The load/unload clock control logic 150 generates a plurality of load control signals LDs and unload control signals UNLDs and applies them to the load/unload multiplexer (MUX) 160 in response to the input clock signal CLK_IN and a controlled clock signal CLK_OUT' from the input clock control logic 140. In the load/unload clock control logic 160, the load and unload control signals LD and UNLD are started from their initial values. An initial unload control signal UNLD is set by the initial parameter Init_UNLD, and an initial load control signal LD is set to "00".

Using the load and unload control signals LDs and UNLDs, the load/unload MUX 160 can load the input data DATA_IN and unload the loaded input data DATA_IN to the master circuit through the data control logic 170 without faults independently of the delay.

Figure 5:
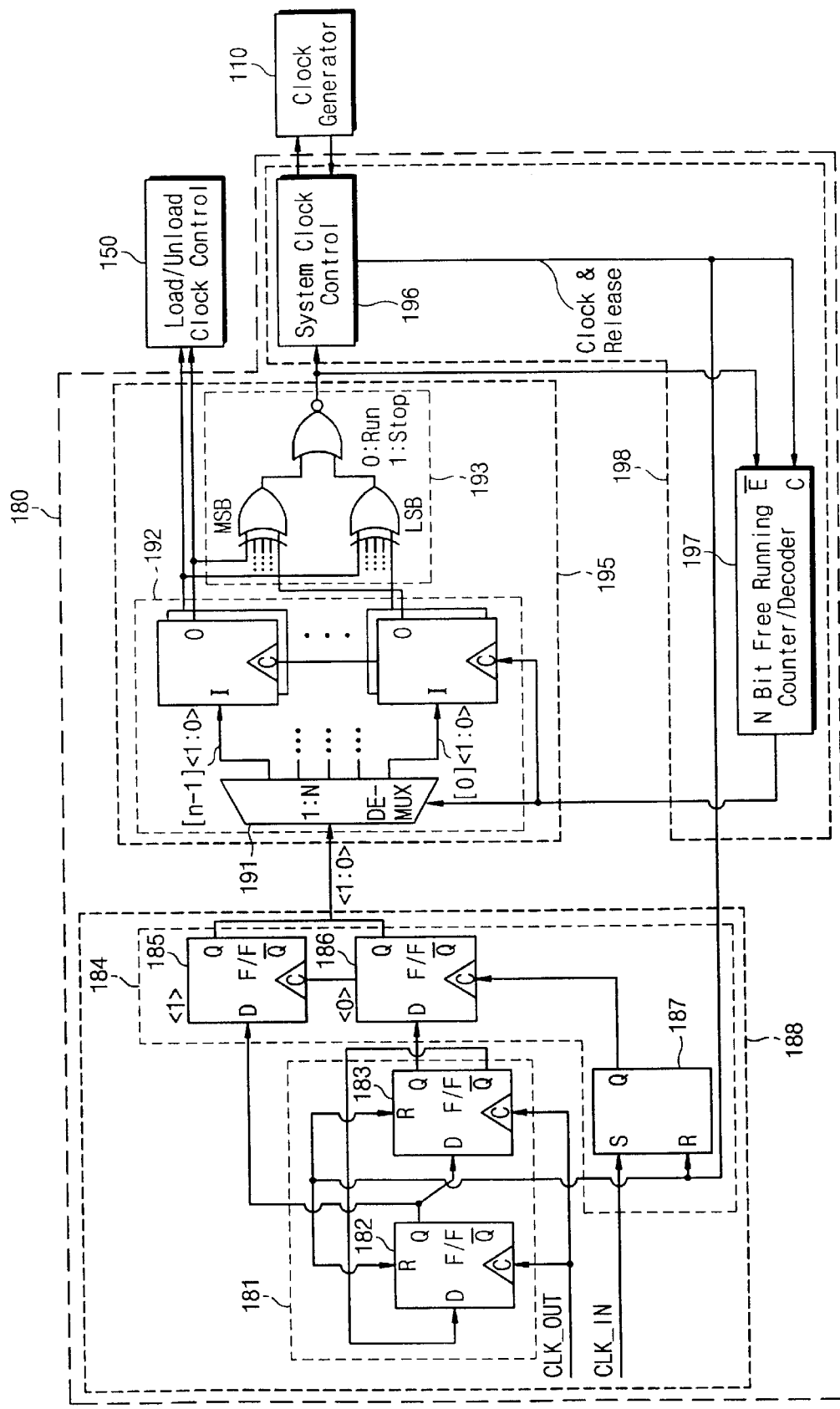
FIG. 5 is a circuit diagram illustrating one embodiment of a delay detection circuit of FIG. 4 in accordance with the present invention.

FIG. 5 is a circuit diagram illustrating one embodiment of a delay detection circuit 180 shown in FIG. 4. Referring to FIG. 5, the delay detection circuit 180 comprises a detecting unit 188, a comparison unit 195 and a control unit 198.

The detecting unit 188 detects the delay between the output clock signal CLK_OUT and the input clock signal CLK_IN. The comparison unit 195 compares the number of N detected delays and outputs the compared result as the initial parameter Init_UNLD to the load/unload clock control logic 150 when all detected delays are equal. Otherwise, if all detected delays are not equal, the control unit 198 concludes that the delay is not detected correctly. In that case, the control logic 198 resets the clock generator 110 and the detecting unit 188, and then controls the comparison unit 195 to compare the detected delays by N-bit free running after releasing the clock generator 110, until all detected delays are equal.

The detecting unit 188 includes a counting circuit 181 and a delay detecting circuit 184. The counting circuit 181 includes a first D flip-flop 182 and a second D flip-flop 183. Each flip-flop toggles in response to the output clock signal CLK_OUT from the master circuit. The delay detecting circuit 184 includes a third D flip-flop 185, a fourth D flip-flop 186, and a R-S flip-flop 187. An output of the first D flip-flop 182 is coupled to an input of the third D flip-flop 185. Similarly, an output of the second D flip-flop 183 is coupled to an input of the fourth D flip-flop 186. The third and fourth D flip-flops 185 and 186 detect the delay in response to the counted result from the counting circuit 181 and the input clock signal CLK_IN from the slave circuit. The input clock signal CLK_IN is inputted to the third and fourth D flip-flops 185 and 186 through the S-R flip-flop 187 as a clock signal.

The comparison unit 195 includes a latching circuit 192 and a comparator 193. The latching circuit 192 has a de-multiplexer 191 and N pieces of latch, for latching each most significant bit (MSB) and each least significant bit (LSB) of the detected delays from the detecting unit 188 by N-bit free running. The comparator 193 has two exclusive-OR (XOR) gates and one NOR gate. Each XOR gate receives the number of N MSBs and the number of N LSBs of the detected results through the de-multiplexer 191, respectively. The XOR gates compare the MSBs and LSBs of the detected results whether or not all detected results are equal. The compared results from the XOR gates are inputted to the NOR gate. If all detected results are equal, the NOR gate outputs a logic high level ("1"). In that case, the LSB and the MSB are outputted to the load/unload clock control logic 150 as the initial parameter Init_UNLD. On the contrary, if all detected results are not equal, the NOR gate outputs a logic low level ("0"). In that case, the clock generator 110 and the detecting unit 188 are reset by the control unit 198.

The control unit 198 includes system clock control logic 196 and an N-bit free running counter/decoder 197. The N bit free running counter/decoder 197 is coupled between the system clock control logic 196 and the latching circuit 192. The N-bit free running counter/decoder 197 is enabled when the output of the comparator 193 is "0". The N-bit free running counter/decoder 197 controls the de-multiplexer 191 so as to perform N-bit free running and provides the clock signal from the clock generator 110 to these latches of the latching circuit 192. The system clock control logic 196 is coupled the comparator 193, the detecting unit 188, the N-bit free running counter/decoder 197 and the clock generator 110. If the comparator 193 outputs "0" to the system clock control logic 196, the system clock control logic 196 resets the clock generator 110 and the detecting unit 188. When the clock generator 110 is released after resetting, the system clock control unit 196 transmits the clock signal from the clock generator 110 to the N-bit free running counter/decoder 197.

Figures 6, 7:
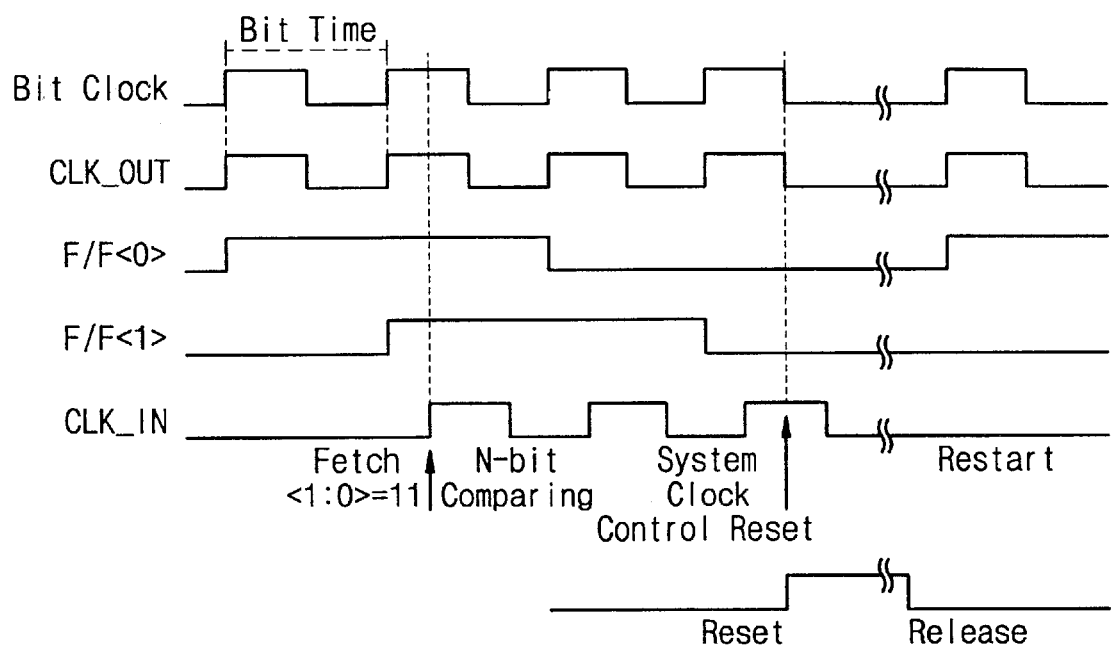
FIG. 6 is a timing diagram illustrating an operation of the delay detection circuit of FIG. 5.
FIG. 7 is a diagram illustrating an initial parameter corresponding to a maximum delay detected by the delay detection circuit of FIG. 5.

FIG. 6 is a timing diagram illustrating operation of the delay detection circuit of FIG. 5. Referring to FIGS. 5 and 6, the first and second D flip-flops 182, 183 toggle in response to the output clock signal CLK_OUT. A wave of F/F<1> is a toggled result of the first D flip-flop 182, and another wave of F/F<0> is a toggle result of the second D flip-flop 183, respectively. The delay detecting circuit 184 detects the delay between the output clock signal CLK_OUT and the input clock signal CLK_IN in response to the toggled results F/F<0> and F/F<1> and the input clock signal CLK_IN.

As shown in the FIG. 6, if a maximum delay between the clocks CLK_OUT and CLK_IN is greater than 1 bit time and less than 2 bit times, the detected delay is "11" which is derived from the toggled results F/F<0> and F/F<1> at a rising edge of the input clock signal CLK_IN.

As described above, if the number of N detected delays are not equal, the system clock control logic 196 resets the clock generator 110 and the detecting unit 188 by a reset signal Reset.

After releasing of the clock generator 110, the above delay detecting method is repeated until all detected delays are equal.

FIG. 7 is a diagram illustrating an initial parameter corresponding to a maximum delay detected by the delay detection circuit of FIG. 5. Referring to FIG. 7, the initial parameter Init_UNLD is determined by the detected maximum delay. As shown in FIGS. 6 and 7, if the maximum delay is greater than 1 bit time and less than 2 bit times, the initial parameter Init_UNLD is determined to be "11", since the fetched result F<1:0> is "11". For example, if the maximum delay is less than 1 bit time, the initial parameter Init_UNLD is determined to be "01".

Figure 8:
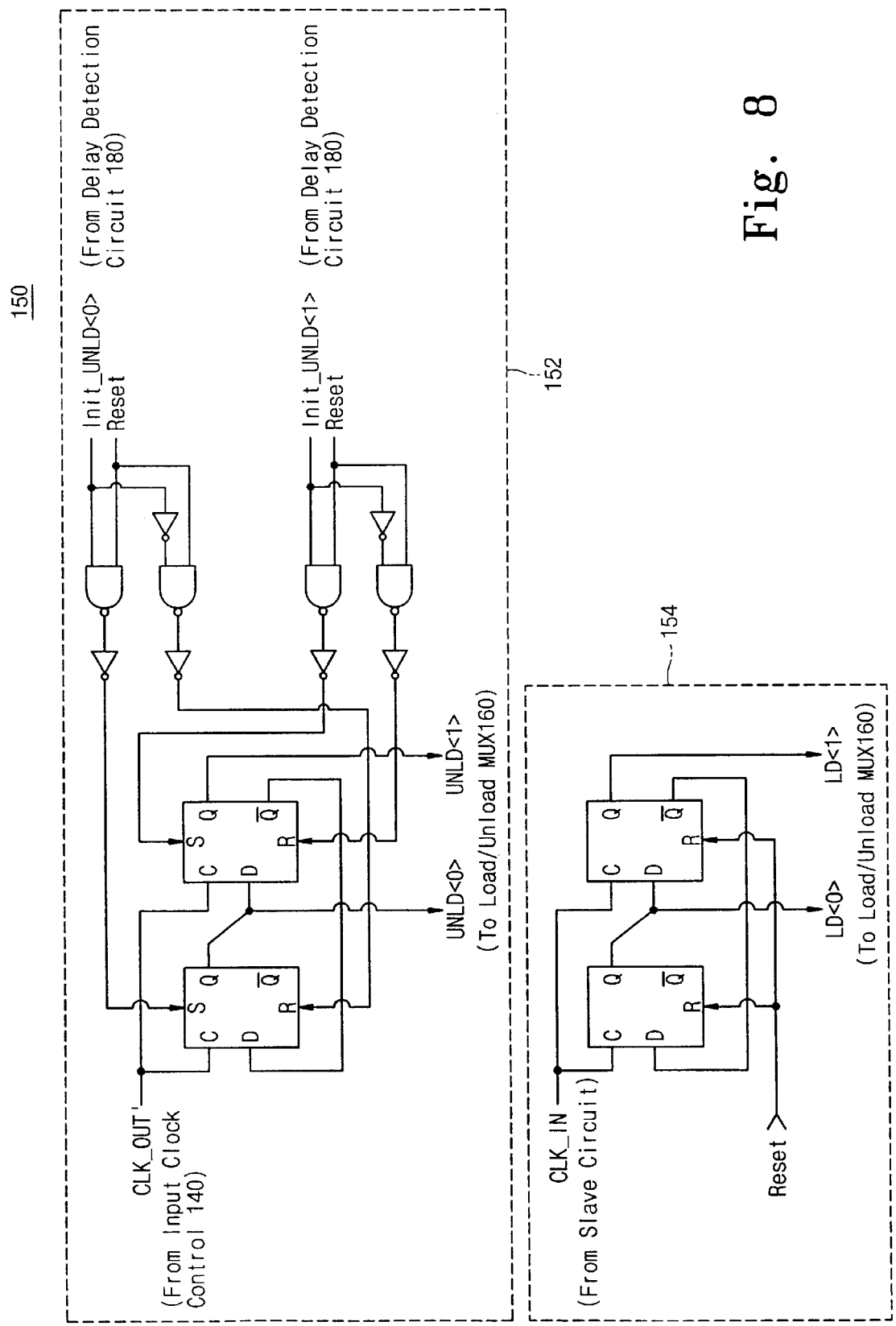
FIG. 8 is a circuit diagram illustrating one embodiment of a load/unload clock control logic of FIG. 4 in accordance with the present invention.
Figure 9:
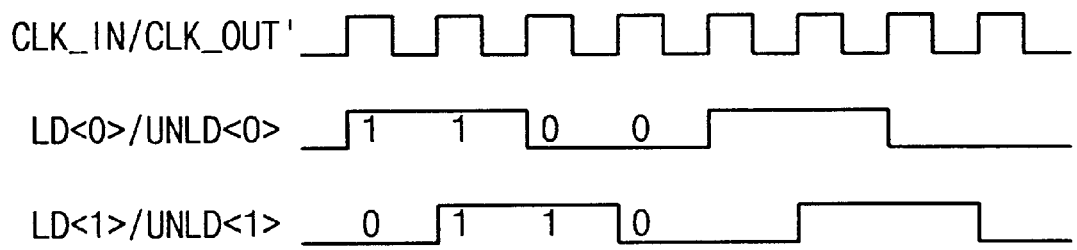
FIG. 9 is a timing diagram illustrating an operation of the load/unload clock control logic of FIG. 8.

FIG. 8 is a circuit diagram illustrating one embodiment of a load/unload clock control logic 150 shown in FIG. 4, and FIG. 9 is a timing diagram illustrating operation of the load/unload clock control logic 150 of FIG. 8. Referring to FIG. 8, the load/unload clock control logic 150 includes an unload control signal generating circuit 152 and a load control signal generating circuit 154. The unload control signal generating circuit 152 includes two D flip-flops for generating a plurality of unload control signals UNLDs by receiving the controlled clock signal CLK_OUT' from the input clock control logic 140 and the detected initial parameter Init_UNLD from the delay detection circuit 180. An initial unload control signal UNLD is set by the initial parameter Init_UNLD. Similarly, the load control signal generating circuit 154 includes two D flip-flops for generating a plurality of load control signals LDs by toggling in response to the input clock signal CLK_IN from the slave circuit. An initial load control signal LD is set to "00".

Referring to FIG. 9, if the initial unload control signal UNLD is set to "11", the unload control signal UNLD is recursively generated to "10", "00", "01", and "11" in response to the controlled clock signal CLK_OUT'. However, the load control signal LD is always recursively generated to "01", "11", "10", and "00" in response to the input clock signal CLK_IN.

Figure 10:
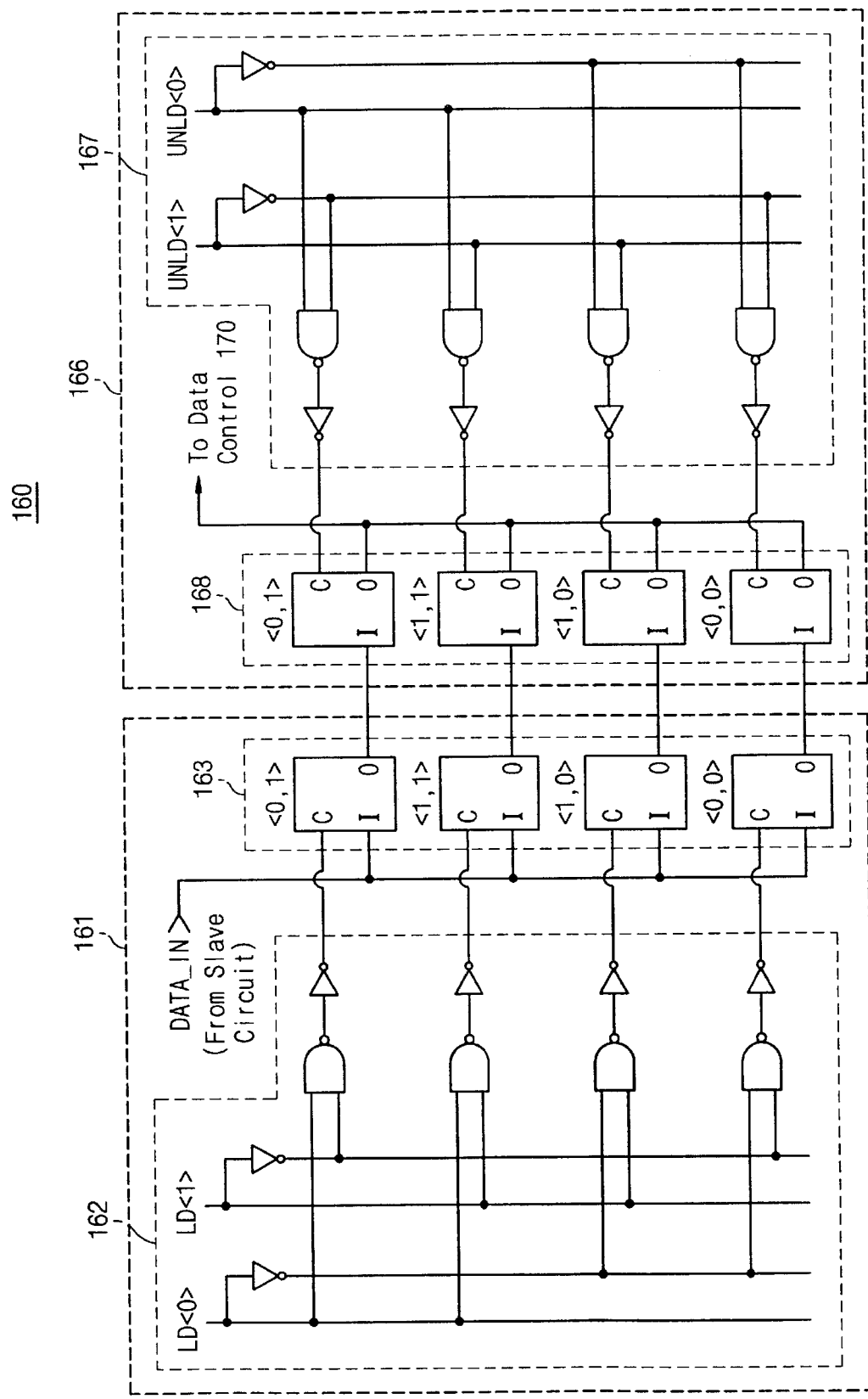
FIG. 10 is a circuit diagram illustrating one embodiment of a load/unload multiplexer of FIG. 4 in accordance with the present invention.

FIG. 10 is a circuit diagram illustrating one embodiment of a load/unload multiplexer 160 shown in FIG. 4. Referring to FIG. 10, the load/unload multiplexer 160 includes a data loading circuit 161 and a data unloading circuit 166. The data loading circuit 161 has a data loading decoder 162 and a plurality of data loading multiplexers 163. The data unloading circuit 166 has a data unloading decoder 167 and a plurality of data unloading multiplexers 168. In that case, the number of inputted load control signals LD and unload control signals UNLD is four. Thus, the loading multiplexers 163 and unloading multiplexers 168 are each composed of four multiplexers.

Each of data loading multiplexers 163 loads the input data DATA_IN from the slave circuit in response to the decoded load control signals LD. Similarly, each of data unloading multiplexers 168 unloads the loaded input data DATA_IN to the internal data bus of the master circuit in response to the decoded unload control signals UNLD.

Figure 11:
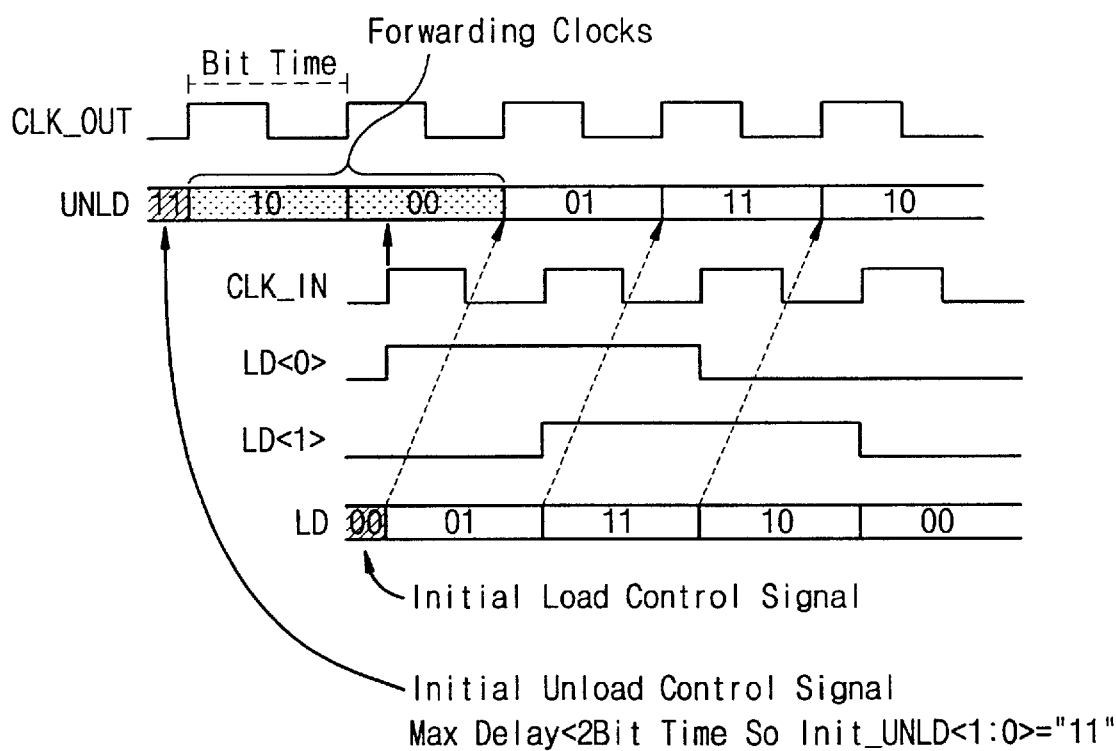
FIG. 11 is a timing diagram illustrating operation of the clock forwarding circuit of FIG. 4.

FIG. 11 is a timing diagram illustrating operation of the clock forwarding circuit 100 shown in FIG. 4. Referring to FIGS. 10 and 11, for example, if the initial unload control signal UNLD is set to "11", the unload control signal UNLD is recursively generated to "10", "00", "01", and "11" in response to the output clock signal CLK_OUT, and the load control signal LD is recursively generated to "01", "11", "10", and "00" in response to the input clock signal CLK_IN. Each of the multiplexers 163 and 168 is turned on in response to the load and unload control signals LD and UNLD so as to load/unload the input data DATA_IN, respectively.

If the initial unload control signal UNLD is set to "11", it means that the maximum delay is greater than 1 bit time and less than 2 bit times. Thus, the clock forwarding circuit according to the present invention forwards two clocks corresponding to the unload control signals UNLDs "10" and "00" to stabilize the data transmission between the clocked circuits, independently of the delay.

Therefore, after forwarding clocks, the data loading multiplexers 163 load the input data DATA_IN in response to the load control signal LD of "01", "11", "10", and "00", respectively. And then the data unloading multiplexers 168 unload the loaded input data DATA_IN in response to the unload control signal UNLD of "01", "11", "10", and "00", respectively. Thus, for example, the input data DATA_IN loaded by the load control signal LD of "01" can be unloaded to the master circuit by the unload control signal UNLD of "01". As a result, the data transmission between the clocked circuits can be performed without faults independently of the delay, by automatically detecting the delay between the interfacing clocks and forwarding clocks corresponding to the detected delay.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A digital system comprising:
   a master circuit having a clock forwarding circuit for generating a first clock signal; and
   a slave circuit coupled to the master circuit for generating a second clock signal synchronized with the first clock signal;
   wherein said clock forwarding circuit receives the second clock signal, detects a delay between the first and second clock signals, and sets initial data load/unload parameters of the master circuit based on the detected delay, the clock forwarding circuit using the initial date load/unload parameters to generate the first clock signal.

2. A clock forwarding circuit comprising:
   a clock generator for generating a clock signal;
   an internal data bus for interfacing data of a master circuit;
   a data control logic coupled to the clock generator and the internal data bus for outputting data to a slave circuit in response to the clock signal;
   an output clock control logic coupled to the clock generator for providing the clock signal to the slave circuit as an output clock signal by controlling the clock signal;
   a delay detection circuit for detecting a delay between the output clock signal and an input clock signal and generating an initial parameter for forwarding clocks corresponding to the detected delay, wherein the input clock signal is a feedback clock signal of the output clock signal;
   a load/unload clock control logic coupled to the delay detection circuit and the input clock control logic for generating load control signals and unload control signals in response to the initial parameter;
   an input clock control logic coupled between the clock generator and the load/unload clock control logic for providing the clock signal from the clock generator to the load/unload clock control logic by controlling the clock signal; and
   a load/unload multiplexer for loading an input data from the slave circuit and unloading the loaded input data to the internal data bus of the master circuit via the data control logic in response to the load and unload control signals from the load/unload clock control logic.

3. The clock forwarding circuit of claim 2, wherein the delay detection circuit comprises:
   detecting means for detecting the delay between the output clock signal and the input clock signal, wherein a total number of the detected delays is N;
   comparing means for comparing the detected delays and outputting a compared result of the detected delays as the initial parameter to the load/unload clock control logic when all detected delays are equal; and
   control means for resetting the clock generator and the detecting means when all detected delays are not equal, and then controlling the comparing means to compare the detected delays by N-bit free running until all detected delays are equal.

4. The clock forwarding circuit of claim 3, wherein the detecting means comprises:
   a counting unit composed of two D flip-flops, wherein each flip-flop toggles in response to the output clock signal from the master circuit; and
   a detecting unit for detecting the delay in response to the counted result from the counting unit and the input clock signal from the slave circuit.

5. The clock forwarding circuit of claim 3, wherein the comparing means comprises:
   a latching unit having a de-multiplexer and N pieces of latch for latching each most significant bit (MSB) and each least significant bit (LSB) of the detected delays from the detecting means by N-bit free running; and
   a comparing unit for comparing each of MSBs and LSBs from the latching unit, respectively, and outputting one of the MSBs and one of the LSBs as the initial parameter to the load/unload clock control logic when all MSBs and all LSBs are equal, respectively.

6. The clock forwarding circuit of claim 5, wherein the control means comprises:
   an N-bit free running counter/decoder for controlling the de-multiplexer to perform N-bit free running and providing the clock signal from the clock generator to the latching unit; and
   a system clock control logic for resetting the clock generator and the detecting means, and enabling the N-bit free running counter/decoder when all detected results are not equal, wherein the system clock control logic provide the clock signal to the N-bit free running counter/decoder after releasing the clock generator.

7. The clock forwarding circuit of claim 2, wherein the load/unload control logic comprises:
   load control signal generating means for generating a plurality of load control signals in response to the input clock signal from the slave circuit; and
   unload control signal generating means for generating a plurality of unload control signals in response to the controlled clock signal from the input clock control logic, wherein an initial unload control signal is set by the initial parameter from the delay detection circuit.

8. The clock forwarding circuit of claim 2, wherein the load/unload multiplexer comprises:
   a data loading circuit having a data loading decoder and a plurality of multiplexers, for loading the input data from the slave circuit in response to the load control signals; and
   a data unloading circuit having a data unloading decoder and a plurality of multiplexers, for unloading the loaded input data to the master circuit via the data control logic, in response to the unload control signals.

* * * * *